United States Patent
Heurtefeu et al.

(10) Patent No.: US 11,286,202 B2
(45) Date of Patent: Mar. 29, 2022

(54) ARTICLE INTENDED TO BE TEMPERED THAT IS PROTECTED BY A TEMPORARY LAYER

(71) Applicant: SAINT-GOBAIN GLASS FRANCE, Courbevoie (FR)

(72) Inventors: Bertrand Heurtefeu, Tremblay-en-France (FR); Stéphane Lohou, Paris (FR); François Guillemot, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 37 days.

(21) Appl. No.: 16/608,431

(22) PCT Filed: Apr. 24, 2018

(86) PCT No.: PCT/FR2018/051024
§ 371 (c)(1),
(2) Date: Oct. 25, 2019

(87) PCT Pub. No.: WO2018/197802
PCT Pub. Date: Nov. 1, 2018

(65) Prior Publication Data
US 2020/0140326 A1    May 7, 2020

(30) Foreign Application Priority Data
Apr. 28, 2017 (FR) ...................................... 1753770

(51) Int. Cl.
B32B 15/04 (2006.01)
B32B 17/06 (2006.01)
(Continued)

(52) U.S. Cl.
CPC ........ *C03C 17/3644* (2013.01); *C03C 17/009* (2013.01); *C03C 17/32* (2013.01);
(Continued)

(58) Field of Classification Search
CPC ................................................ C03C 2218/355
(Continued)

(56) References Cited

U.S. PATENT DOCUMENTS

| | | | |
|---|---|---|---|
| 6,682,773 B2 * | 1/2004 | Medwick | B65G 49/069 427/154 |
| 2006/0065350 A1 * | 3/2006 | Richardson | C09D 5/008 156/99 |

(Continued)

FOREIGN PATENT DOCUMENTS

| | | |
|---|---|---|
| WO | WO 2015/019022 A1 | 2/2015 |
| WO | WO 2015/185848 A1 | 12/2015 |

OTHER PUBLICATIONS

Mimaki (https://india.mimaki.com/archives/013/037-U070425%20%20UV%20ink%20LF-140%20Black_US_Ver.6.0.pdf), obtained Apr. 2021.*

(Continued)

*Primary Examiner* — Lauren R Colgan
(74) *Attorney, Agent, or Firm* — Pillsbury Winthrop Shaw Pittman LLP (57) ABSTRACT

An article includes a glass substrate comprising two main faces defining two main surfaces separated by edges, the substrate bearing a functional coating deposited on at least (Continued)

one portion of a main surface and a temporary protective layer deposited on at least one portion of the functional coating having a thickness of at least 1 micrometer, wherein the temporary protective layer includes an organic polymer matrix and infrared-absorbing materials.

12 Claims, 2 Drawing Sheets

(51) Int. Cl.
    *C03C 17/36*      (2006.01)
    *C03C 17/00*      (2006.01)
    *C03C 17/32*      (2006.01)
    *C03C 17/42*      (2006.01)
    *C03C 23/00*      (2006.01)

(52) U.S. Cl.
    CPC ............ *C03C 17/42* (2013.01); *C03C 23/002* (2013.01); *C03C 2217/256* (2013.01); *C03C 2217/485* (2013.01); *C03C 2218/118* (2013.01); *C03C 2218/156* (2013.01); *C03C 2218/355* (2013.01)

(58) Field of Classification Search
    USPC .................................. 428/426, 428, 432, 434
    See application file for complete search history.

(56) References Cited

U.S. PATENT DOCUMENTS

| | | | | |
|---|---|---|---|---|
| 2007/0231553 | A1* | 10/2007 | Hartig | C03C 17/34 428/216 |
| 2012/0009388 | A1* | 1/2012 | Varaprasad | C03C 17/42 428/172 |
| 2013/0057625 | A1* | 3/2013 | Yamazaki | C09D 11/40 347/100 |
| 2013/0115468 | A1* | 5/2013 | Kharchenko | C03C 17/3644 428/426 |
| 2016/0194516 | A1* | 7/2016 | Nadaud | C23C 14/0641 428/336 |
| 2018/0141858 | A1* | 5/2018 | Kharchenko | C03C 17/23 |

OTHER PUBLICATIONS

International Search Report as issued in International Patent Application No. PCT/FR2018/051024, dated Jul. 10, 2018.

* cited by examiner

ARTICLE INTENDED TO BE TEMPERED THAT IS PROTECTED BY A TEMPORARY LAYER

CROSS-REFERENCE TO RELATED APPLICATIONS

This application is the U.S. National Stage of PCT/FR2018/051024, filed Apr. 24, 2018, which in turn claims priority to French patent application number 1753770 filed Apr. 28, 2017. The content of these applications are incorporated herein by reference in their entireties.

The invention relates to articles comprising a glass substrate coated with a protected functional coating that are intended to be thermally tempered. The invention relates more particularly to the optimization of these articles with a view to improving the thermal tempering conditions and thus achieving significant energy savings.

Thermal tempering consists in bringing a glass substrate to a temperature close to its softening point (from 570 to 700° C., depending on its composition) and in rapidly cooling it. This process creates tensile and compressive stresses that give the glass substrate superior mechanical properties in terms of impact resistance. When a thermally tempered glass breaks, it shatters into numerous small fragments.

A glass substrate comprising an infrared-reflecting functional coating is more difficult to temper than a glass substrate with no functional coating or a "bare" glass substrate. The functional coating reflects infrared rays at the expense of the heating of the glass substrate. The energy that should be absorbed by the substrate and enable the heating thereof is reflected by the functional coating. Consequently, it is necessary to increase the convection of the heat in tempering furnaces in order to temper a glass substrate comprising an infrared-reflecting functional coating.

The functional coatings may be conventionally deposited by sputtering. The industrial deposition process consists in running the substrates on a continuous production line comprising one or more vacuum deposition chambers.

The applicant has developed an organic temporary protective layer specifically used to protect glass substrates intended to be thermally tempered. This protective layer is described as "temporary" since it is removed during the tempering by thermal decomposition. These temporary protective layers are described in application WO 2015/019022.

The formulation of the temporary protective layer has been optimized so as to be able to be deposited and crosslinked through suitable means that can be directly integrated at the outlet of the functional coating deposition chamber. This makes it possible to prevent any contamination of the coated substrates and to continuously manufacture protected articles.

In order to achieve this result, the temporary protective layer must in particular have:
 a viscosity suitable for being deposited with the required thickness at a speed compatible with the run speeds of the substrate on the production line,
 a crosslinking speed that is also compatible with the run speeds of the substrate on the production line.

The formulation of the temporary layer is also suitable for being completely removed following the heat treatment without being detrimental to the optical properties of the substrate bearing the functional coating.

The objective of the temporary protective layers described in application WO 2015/019022 is to protect the articles from scratches. These temporary layers are not used for the purpose of optimizing the tempering conditions in order in particular to make energy savings. The heat treatment times and temperatures are simply chosen in order to completely "burn off" the temporary protective layer.

In order to make energy savings, at a fixed tempering temperature, it is sought to reduce the time of the high-temperature heat treatment step. For this purpose, minimum tempering times are determined that make it possible to obtain the required properties, namely:
 the obtainment of good-quality glazing: absence of breakage, of iridescence, of corrosion of the functional coating, flatness,
 the fragmentation,
 the removal of the temporary protective layer.

The obtainment of the required properties is verified by fragmentation tests during which the glass articles are broken. Fragments are obtained. The size, the number, the longest dimension of the fragments and the appearance of the edges, give an account of the quality of the tempering.

When the removal of the temporary protective layer is complete, the following are observed:
 no residue following the tempering, the article is completely clean,
 some residues present but these residues are easily removed by simple wiping with a cloth.

The removal of the temporary protective layer is considered to be unsatisfactory when residues are observed following the heat treatment that cannot be removed by wiping with a cloth.

The applicant has surprisingly discovered that these temporary protective layers make it possible to reduce the time during which the substrate is brought to high temperature during the tempering. This high-temperature treatment time is referred to in the remainder of the text as "tempering time".

A saving is obtained when comparing the minimum tempering times:
 of an article comprising a glass substrate coated with a functional coating protected by a temporary protective layer (Article E) and
 of an article comprising a glass substrate coated with a functional coating (Article F).

However, nothing indicated that such a saving could be obtained. Application WO 2015/019022 does not contain any indication showing that the use of such a temporary protective layer would make it possible to reduce the times and/or the temperatures of a tempering type heat treatment. Only experiments with a view to optimizing the tempering conditions made it possible to demonstrate a beneficial effect specifically attributable to the temporary protective layer.

Armed with the discovery of this surprising advantage, the applicant has sought to develop an organic temporary protective layer having the additional role of making it possible to reduce the tempering conditions, i.e. the temperature or the time during which the glass substrate is brought to high temperature.

For this purpose, the invention relates to an article comprising a glass substrate comprising two main faces defining two main surfaces separated by edges, said substrate bearing:
 a functional coating deposited on at least one portion of a main surface and
 a temporary protective layer deposited on at least one portion of the functional coating having a thickness of at least 1 micrometer, characterized in that the temporary protective layer comprises an organic polymer matrix and infrared-absorbing materials.

The invention also relates to a process for obtaining an article treated at high temperature. The article comprises a glass substrate comprising two main faces defining two main surfaces separated by edges, said glass substrate bearing a functional coating deposited on at least one portion of a main surface. The process comprises the following steps:

a step of protecting the article comprising:
- preparing a polymerizable composition comprising infrared-absorbing materials,
- applying the composition on at least one portion of the functional coating over a thickness of at least 1 micrometer,
- crosslinking the composition so as to form the temporary protective layer, a same step of heat treating and deprotecting the article comprising:
- removing the temporary protective layer by heat treatment at a temperature above 200° C. and sufficient to achieve the tempering of the article.

The process of the invention makes it possible to reduce the tempering conditions, i.e. the temperature and/or the time during which the article is brought to high temperature.

The applicant has discovered that the use of an organic temporary protective layer comprising infrared-absorbing materials makes it possible to significantly reduce the tempering times or temperatures. The temporary protective layer absorbs the infrared radiation, in particular the radiation that may be reflected by the functional coating, and reemits energy in the form of heat in the immediate vicinity of the glass substrate. The temporary protective layer thus helps to increase the final energy provided to the glass substrate owing to phenomena of absorption, of creation of energy and of transfer of the absorbed and/or created energy.

Finally, the presence of absorbent materials is not detrimental to the good properties of removing the temporary protective layer.

The temporary protective layer is obtained from a polymerizable composition. The absorbent materials may be added in sufficient proportions to have the desired significant effect, directly to the polymerizable composition, without modifying the essential properties thereof, namely:
- its viscosity that contributes to the deposition of the required thicknesses at a speed compatible with the industrial requirements,
- its crosslinking/drying speed that must also be compatible with the industrial requirements.

The infrared-absorbing materials absorb in the range of wavelengths greater than 800 nm, preferably between 800 and 5000 nm, in particular around 3000 nm. This value corresponds to the peak of the radiation spectrum of the black body at the tempering temperatures.

All the luminous characteristics presented in the present description are obtained according to the principles and methods described in European standard EN 410 relating to the determination of the luminous and solar characteristics of glazing used in glass for building.

The transmittance and the reflection are measured at various wavelengths between 800 and 2000 nm with a Perkin Elmer Lambda 900.

The transmittance of the protected article according to the invention measured at a wavelength between 800 and 2000 nm is, in increasing order of preference, less than 80%, less than 70%, less than 60%, less than 50%, less than 40%, less than 30%, less than 20%, less than 10%.

The presence of a temporary protective layer comprising IR-absorbing materials leads to a variation in the transmittance or in the reflection in the infrared of the article comprising a functional coating and such a protective layer compared to the same article with no protective layer. The impact of the protective layer on the variation in the transmittance or in the reflection depends on the properties of the functional coating.

Specifically, if the functional coating has, as properties, a low transmittance and a high reflection in the infrared, the presence of the IR-absorbing protective layer will substantially modify the reflection of the article and not the transmittance.

On the other hand, if the functional coating has, as properties, a higher transmittance and a lower reflection in the infrared, the presence of the IR-absorbing protective layer may more substantially modify the transmittance of the article.

Consequently, the temporary protective layer leads to:
- a variation in the transmittance, measured at a wavelength of between 800 and 2000 nm, in increasing order of preference, of greater than 20%, greater than 30%, greater than 40%, greater than 50%, greater than 60%, greater than 65%, or

- a variation in the reflection, measured at a wavelength of between 800 and 2000 nm, in increasing order of preference, of greater than 20%, greater than 30%, greater than 40%, greater than 50%, greater than 60%, greater than 65%.

The variation is obtained by respectably measuring the transmittance or the reflection at a wavelength between 800 and 2000 nm of an article that does not comprise a temporary protective layer (T.ref or R.ref) and of a same article comprising the temporary layer (T.pro or R.pro) then by carrying out the following calculations:

$$\Delta T = |T.\text{ref} - T.\text{pro}| \text{ and } \Delta R = |R.\text{ref} - R.\text{pro}|.$$

The infrared-absorbing material may be chosen from pigments and dyes. These absorbent materials must preferably withstand temperatures above 300° C., preferably above 400° C. and better still above 500° C., i.e. they must not be degraded at these temperatures. The infrared-absorbing materials have a weight loss onset temperature, in increasing order of preference, above 300° C., above 400° C., above 500° C. Preferably, the weight loss temperature is below 700° C. This weight loss temperature may be measured by thermogravimetric analysis (TGA).

The pigment may be chosen from the group formed by carbon black pigments, aniline black pigments, iron oxide black pigments, titanium oxide black pigments.

The infrared-absorbing materials may be in the form of particles, the size of which does not exceed the thickness of the temporary protective layer.

According to the invention, the mean size of the particles is measured by dynamic light scattering (DLS), according to the cumulants analysis method described in standard ISO 22412:2017.

The ratio of the thickness of the temporary protective layer to the mean size of particles of absorbent materials is, in increasing order of preference:
- greater than 3, greater than 5, greater than 10, greater than 15, greater than 20, greater than 25, and/or
- less than 300, less than 200, less than 150, less than 100, less than 80, less than 60, less than 50, less than 40.

The specific choice of this ratio makes it possible to obtain a temporary protective layer that retains its advantageous protective properties. Specifically, the size of particles of absorbent materials is chosen as a function of the thickness of the layer so as to:

not to create bridges between the ambient air and the functional coating and thus retain the water-repellent properties of the temporary protective layer, not to weaken the mechanical strength of the temporary protective layer on the functional coating, to retain the excellent protection against scratches.

The mean size of the particles of absorbent materials is, in increasing order of preference:

greater than 50 nm, greater than 100 nm, greater than 200 nm, greater than 300 nm, greater than 400 nm, greater than 500 nm, less than 5 µm, less than 2 µm, less than 1 µm, less than 900 nm, less than 800 nm, less than 700 nm.

The proportions of absorbent materials may be adjusted. The absorbent materials represent, in increasing order of preference, 0.5 to 10 parts, 1.0 to 5.0 parts, 2.0 to 4.0 parts by weight per 100 parts by weight of the organic polymer matrix. A temporary protective layer comprising these proportions of absorbent materials is easily crosslinked by UV polymerization.

The solution of the invention is inexpensive and easy to implement. Specifically, among the infrared-absorbing dyes and pigments, some have a low cost. The presence of the absorbent materials in the polymerizable composition does not require additional solvent and is not detrimental to the curing of the temporary protective layer. Consequently, the solution of the invention does not necessitate adapting the process for manufacturing the protected articles.

In the remainder of the text, the preferred embodiments apply in the same way to the various subjects of the invention, the article and the process.

The temporary protective layer according to the invention is specifically intended to be removed during a thermal tempering at a sufficient temperature to enable the removal thereof by thermal decomposition without damaging the optical, energy or thermal properties of the substrate bearing the functional coating. One and the same heat treatment step of the protected substrate makes it possible to remove the protective layer from the substrate and to give the substrate certain properties or conformation (tempered and/or curved substrate).

The temporary protective layer advantageously has one or more of the following features:

it has a thickness of at least 1 micrometer, it is insoluble in water, it is obtained from a polymerizable composition comprising (meth)acrylate compounds, it is cured by drying, by IR curing, by UV irradiation or by electron beam.

The temporary protective layer essentially comprises organic materials of (meth)acrylate polymer type. Its chemical formulation enables rapid and complete combustion during a heat treatment and during its decomposition only generates volatile molecules that are easy to eliminate.

The temporary protective layer is obtained from a polymerizable composition. The polymerizable composition comprises at least polymerizable organic compounds and at least one infrared-absorbing material.

The polymerizable organic compounds are preferably (meth)acrylate compounds chosen from monomers, oligomers, prepolymers or polymers comprising at least one (meth)acrylate function.

The application of a temporary protective layer obtained from a liquid polymerizable composition that is essentially free of solvent and is preferably cured by UV irradiation, by IR curing or by an electron beam is particularly advantageous. The choice of this solvent-free technology considerably simplifies the industrial implementation of a process comprising a step of applying such a layer. The absence of solvent makes it possible to avoid installing a device for drying, recovering and treating the solvent vapors that must not be emitted into the atmosphere. The modifications to be made may be limited to inserting, at the end of the line, a deposition device, for example a roller coater deposition device and also a crosslinking device such as a UV lamp.

The temporary protective layer according to the invention is preferably applied at the outlet of the line for manufacturing substrates bearing functional coatings. The step of depositing the temporary protective layer may be easily integrated into the process for manufacturing the substrate bearing the functional coating.

The polymerizable composition has, owing to the judicious choice of the (meth)acrylate compounds, a viscosity suitable for making it possible to easily obtain a temporary protective layer having a thickness greater than or equal to 1 µm and sufficient reactivity to enable virtually instantaneous crosslinking throughout the thickness. The chemical nature, the degree of crosslinking, the density and also the thickness of the temporary protective layer contribute to obtaining effective protection against abrasion, the appearance of scratches and corrosion. These protective properties are obtained for thicknesses of less than 50 micrometers.

Finally, the absence of solvent coupled with the virtually instantaneous curing, for example by UV irradiation or by an electron beam, makes it possible to obtain protected substrates with no effect on the production rates. Advantageously, the coating rates are compatible with the rates of deposition of the functional coatings which enables continuous manufacture of substrates bearing a functional coating and a temporary protective layer according to the invention. For example, the rates of application of the temporary protective layer, comprising for example the coating and the crosslinking, may be between 1 and 90 m/min on a substrate having a width of from 1 m to 3.3 m.

This water-insoluble temporary protective layer makes it possible to obtain effective protection during the washing step and against wet corrosion. The protection is maintained even when the substrate undergoes successive cutting operations. Indeed, the substrates protected according to the invention appear to be protected from corrosion mechanisms that could be initiated on the one hand on the full face but also from the cutting edge. The substrates protected according to the invention may therefore be cut several times without it being necessary to modify the protective layer and without losing the mechanical and chemical protection functions.

The functional coating is deposited by magnetron sputtering.

Preferably, the protected substrate, i.e. the substrate bearing the temporary protective layer, has not undergone a heat treatment of tempering, annealing and/or bending type, that is to say heat treatment at a temperature above 200° C. or above 400° C. The protected substrate is not tempered and/or curved.

Preferably, the substrate bearing the functional coating has not undergone a high-temperature heat treatment of tempering, annealing and/or bending type, that is to say heat treatment at a temperature above 200° C. or above 400° C. This means that the article formed by the substrate and the functional coating has not undergone a high-temperature heat treatment. This also means that the process does not comprise a step of high-temperature heat treatment, that is to say heat treatment at a temperature above 200° C. or above 400° C., between the deposition of the functional coating and the deposition of the temporary protective layer.

Although the invention is very particularly suitable for the protection of substrates bearing mechanically weak functional coatings, the solution of the invention may be applied to the protection of substrates bearing any type of functional coating.

The functional coating reflects infrared radiation. The functional coating comprises at least one functional layer.

The functional layer is preferably a layer that can act on solar radiation and/or infrared radiation of long wavelength. These functional layers are for example metallic functional layers based on silver or on a metal alloy containing silver.

The substrate may comprise a functional coating comprising a stack of thin layers successively comprising, starting from the substrate, an alternation of n functional metallic layers, in particular functional layers based on silver or on a metal alloy containing silver, and of (n+1) antireflection coatings, each antireflection coating comprising at least one dielectric layer, so that each functional metallic layer is positioned between two antireflection coatings. Preferably, n is equal to 1, 2, 3 or 4. Even more preferably, n is greater than 1, in particular n is equal to 2 or 3.

The substrate may comprise a stack of thin layers successively comprising, starting from the substrate, an alternation of two functional metallic layers, in particular functional layers based on silver or on a metal alloy containing silver, and of three antireflection coatings, each antireflection coating comprising at least one dielectric layer, so that each functional metallic layer is positioned between two antireflection coatings.

The substrate may also comprise a stack of thin layers successively comprising, starting from the substrate, an alternation of three functional metallic layers, in particular functional layers based on silver or on a metal alloy containing silver, and of four antireflection coatings, each antireflection coating comprising at least one dielectric layer, so that each functional metallic layer is positioned between two antireflection coatings.

The thickness of the functional coating is:
greater than 100 nm, preferably greater than 150 nm,
less than 300 nm, preferably less than 250 nm.

According to one particularly advantageous embodiment of the invention, the functional coating comprises an upper layer chosen from nitrides, oxides or oxynitrides of titanium and/or of zirconium. The upper layer of the functional coating is the layer furthest from the substrate and/or the layer in direct contact with the temporary protective layer.

The upper layer may in particular be a layer:
of titanium nitride; of zirconium nitride; of hafnium nitride; of titanium zirconium nitride; of titanium zirconium hafnium nitride;
of titanium oxide; of zirconium oxide; of hafnium oxide; of titanium zirconium oxide; of titanium zirconium hafnium oxide.

The thickness of these upper layers is preferably between 1 and 20 nm and better still between 1 and 5 nm.

According to one variant, the upper layer may be a silicon nitride layer, optionally doped with aluminum. The thickness of this upper layer is preferably between 5 and 50 nm and better still between 10 and 50 nm.

The functional coating may be deposited by any known means such as by magnetron sputtering, by thermal evaporation, by CVD or PECVD, by pyrolysis, by chemical deposition, by sol-gel deposition or wet deposition of inorganic layers.

The functional coating is preferably deposited by magnetron sputtering. According to this advantageous embodiment, all the layers of the functional coating are deposited by magnetron sputtering. The temporary protective layer is advantageously directly in contact with the functional coating.

The temporary protective layer comprises a polymer matrix. The polymer matrix is essentially of organic nature. This matrix results from the crosslinking of the polymerizable organic compounds present in the polymerizable composition.

The polymer matrix represents at least 80% by weight of the temporary protective layer.

The polymer matrix is obtained from a polymerizable composition comprising polymerizable organic compounds, preferably (meth)acrylate compounds. The (meth)acrylate compounds that have reacted together representing at least 80%, preferably at least 90%, or even 100% by weight of the polymer matrix.

The term "(meth)acrylate" is understood to mean an acrylate or a methacrylate. The expression "(meth)acrylate compounds" is understood to mean the esters of acrylic or methacrylic acid comprising at least one acryloyl ($CH_2$=CH—CO—) or methacryloyl ($CH_2$=CH($CH_3$)—CO—) function. These esters may be monomers, oligomers, prepolymers or polymers. These (meth)acrylate compounds, when they are subjected to the polymerization conditions, give a polymer network endowed with a solid structure.

The (meth)acrylate compounds used according to the invention may be selected from monofunctional and polyfunctional (meth)acrylates such as mono-, di-, tri- and poly-functional (meth)acrylates. Examples of such monomers are:

monofunctional (meth)acrylates such as methyl (meth)acrylate, ethyl (meth)acrylate, n- or tert-butyl (meth)acrylate, hexyl (meth)acrylate, cyclohexyl (meth)acrylate, 2-ethylhexyl (meth)acrylate, benzyl (meth)acrylate, 2-ethoxyethyl (meth)acrylate, phenoxyethyl (meth)acrylate, hydroxyethyl acrylate, hydroxypropyl (meth)acrylate, vinyl (meth)acrylate, caprolactone acrylate, isobornyl methacrylate, lauryl methacrylate, polypropylene glycol monomethacrylate, difunctional (meth)acrylates such as 1,4-butanediol di(meth)acrylate, ethylene dimethacrylate, 1,6-hexanediol di(meth)acrylate, bisphenol A di(meth)acrylate, trimethylolpropane diacrylate, triethylene glycol diacrylate, ethylene glycol di(meth)acrylate, polyethylene glycol di(meth)acrylate, tricyclodecane dimethanol diacrylate, trifunctional (meth)acrylates such as trimethylolpropane trimethacrylate, trimethylolpropane triacrylate, pentaerythritol triacrylate, ethoxylated trimethylolpropane triacrylate, trimethylolpropane trimethacrylate, tripropylene glycol triacrylate, (meth)acrylates of higher functionality such as pentaerythritol tetra(meth)acrylate, ditrimethylpropane tetra(meth)acrylate, dipentaerythritol penta(meth)acrylate or hexa(meth)acrylate.

Preferably, the temporary protective layer does not comprise additives that are not capable of being eliminated during the heat treatment such as silicon-comprising organic compounds of siloxane type.

The temporary protective layer has a thickness:
greater than 1 micrometer, preferably greater than 5 micrometers, and/or
less than 100 micrometers, preferably less than 50 micrometers, and/or
between 2 and 100 micrometers, between 5 and 50 micrometers or between 10 and 30 micrometers.

The temporary protective layer has a grammage between 5 and 50 g/m², preferably between 10 and 30 g/m².

According to advantageous embodiments of the invention, the polymerizable composition has one or more of the following features:
the polymerizable composition comprises less than 20% by weight of solvent relative to the total weight of the polymerizable composition,
the polymerizable composition comprises less than 10% by weight of solvent relative to the total weight of the polymerizable composition,
the polymerizable composition is solvent-free,
the polymerizable composition is liquid,
the polymerizable composition has a viscosity measured at 25° C.:
of at least 0.05 Pa·s, of at least 0.08 Pa·s, of at least 0.1 Pa·s, of at least 0.50 Pa·s,
of at most 5 Pa·s, of at most 2 Pa·s,
between 0.05 and 5 Pa·s;
the polymerizable composition comprises at least one polymerization initiator, preferably a photoinitiator,
the polymerization initiator represents 0.1% to 20%, or 1% to 15%, preferably 5% to 15% and better still 8% to 12% by weight of the total weight of polymerizable organic compounds, preferably of the (meth)acrylate compounds,
the polymerizable composition further comprises at least one additive selected from plasticizers, separating agents, heat and/or light stabilizers, thickeners or surface modifiers,
the sum of all the additives is between 0 and 5% by weight of the weight of the polymerizable composition,
the (meth)acrylate compounds selected from esters of acrylic or methacrylic acid comprising at least two acryloyl ($CH_2=CH-CO-$) or methacryloyl ($CH_2=CH(CH_3)-CO-$) functions,
the polymerizable composition comprises, by weight relative to the total weight of the (meth)acrylate compounds, in increasing order of preference, at least 50%, at least 60%, at least 70%, at least 80%, at least 90% or 100% of (meth)acrylate compounds selected from esters of acrylic or methacrylic acid comprising at least two acryloyl ($CH_2=CH-CO-$) or methacryloyl ($CH_2=CH(CH_3)-CO-$) functions,
the polymerizable composition comprises:
at least one aliphatic urethane-acrylic oligomer,
at least one (meth)acrylate monomer selected from mono-, bi- or tri-functional (meth)acrylate monomers,
at least one polymerization initiator,
the polymerizable composition comprises:
at least one aliphatic urethane-acrylic oligomer,
at least one difunctional (meth)acrylate monomer,
at least one trifunctional (meth)acrylate monomer,
at least one polymerization initiator, preferably a photoinitiator,
the polymerizable composition comprises, by weight relative to the total weight of the (meth)acrylate compounds:
30% to 80% by weight of at least one aliphatic urethane-acrylic oligomer,
20% to 70% by weight of at least one (meth)acrylate monomer selected from a mono-, bi- or tri-functional (meth)acrylate.

According to the invention, the polymerization initiators and the infrared-absorbing material(s) are not considered to be additives in particular for the determination of the proportions in the polymerizable composition or in the temporary protective layers.

The polymerizable composition may be applied at ambient temperature by any known means and in particular by roller coating, flow coating, dip coating, curtain coating or spray coating. The polymerizable composition is preferably applied by roller coating. The rate of deposition of the polymerizable composition may be between 1 and 90 m/min.

The temporary protective layer may be cured:
by drying at a temperature below 200° C. for a duration ranging for example from 10 s to 180 s,
by UV crosslinking (various wavelengths) preferably in open air and at ambient temperature or
by an electron beam.

The polymerizable composition further comprises a polymerization initiator, the nature of which depends on the type of curing selected. For example, in the case of thermal curing, initiators of benzoyl peroxide type are used. In the case of curing by UV radiation, initiators referred to as photoinitiators are used.

The substrate to be protected must withstand a heat treatment of tempering type. The invention therefore relates to any substrate capable of being tempered. The substrate is preferably a glass substrate.

Advantageously, the substrate bearing the temporary protective layer has not undergone a heat treatment of tempering, annealing and/or bending type, that is to say heat treatment at a temperature above 200° C.

The glass substrate may be flat, colorless and/or colored. The thickness of the substrate is preferably between 1 and 19 mm, more particularly between 2 and 10 mm, or even between 3 and 6 mm.

According to one variant of the invention, the temporary protective layer may be used to protect the functional coating during a step of depositing another coating. This other coating may be deposited on a portion of the main surface of the substrate that bears the functional coating or on a portion of the main surface of the substrate that does not bear the functional coating.

It is in particular known that to obtain bi-functionalized substrates bearing a functional coating on each main face, the contact of the functional coating deposited first with the rolls of the deposition device during the second pass enabling the deposition of the second coating leads to alterations that are damaging to the quality of the first coating (contamination, scratches). These alterations becoming visible after deposition of the second functional coating and optionally tempering. The invention makes it possible to overcome this problem by protecting the first coating with a protective layer intended to disappear during the tempering or bending of the bifunctionalized substrate.

According to another variant of the invention, the temporary protective layer may be used to protect the rear surface of the substrate during the deposition of a functional coating. Indeed, the passage on the rolls of the rear face of a substrate, for example made of glass, during the deposition of a functional coating, is capable of partially altering said surface (soiling, scratching). The invention makes it possible to overcome this problem by protecting the rear surface of the substrate before deposition of the first coating.

The temporary protective layer may be deposited:
on each of the main surfaces of the substrate and/or
on at least one edge of the substrate and/or
on each of the edges of the substrate.

When the temporary protective layer is deposited on each of the main surfaces of the substrate and on each of the edges of the substrate, the chemical and/or mechanical protection is then conferred on the entire surface area of the substrate.

The temporary protective layer may be deposited on a glass substrate before or after a cutting step, that is to say on a glass substrate that is at the final size or close to the final size (crude).

The invention also relates to the process for obtaining an article comprising a substrate. The heat treatment temperature is above 200° C., above 300° C., or above 400° C. The heat treatments are selected from tempering and/or bending.

The heat treatment needed for removing the protective layer may be annealing in a static or dynamic furnace. The heat treatment may then have the objective of improving the crystallization of one or more layers included in the stack to be protected.

The functional coating comprises at least one functional layer deposited during a magnetron deposition step.

The temporary protective layer is formed immediately after the step of depositing the functional coating. According to the invention, it is considered that the temporary protective layer may be formed "immediately after", when the temporary protective layer may be formed less than 10 minutes, preferably less than 5 minutes and better still less than 1 minute after the step of depositing the functional coating.

The articles protected according to the invention may be stacked without cross contamination, nor appearance of mechanical scratches, immediately after deposition of the functional coatings.

EXAMPLES

1. Substrates Coated with the Functional Coating

The substrates used are flat glass substrates having a thickness of around 6 mm obtained by a float process.

The functional coatings comprise a stack of thin layers deposited by means of a magnetron sputtering device.

The stack of thin layers successively comprises, starting from the substrate, an alternation of three dielectric coatings and of two silver layers (functional metallic layers), each dielectric coating comprising at least one dielectric layer, so that each functional metallic layer is positioned between two dielectric coatings. The layer of the functional coating furthest from the substrate is a 1 to 5 nm layer of titanium zirconium nitride. The total thickness of this functional coating is between 150 and 200 nm.

2. Preparation of the Polymerizable Compositions

The polymerizable compositions were prepared. These compositions comprise polymerizable organic compounds, polymerization initiators and optionally additives and infrared-absorbing materials.

The polymerizable organic compounds comprise oligomers, monomers and optionally prepolymers. A mixture of oligomers and monomers comprising at least one acrylate function sold by Sartomer was used with, in particular:

CN9276: tetrafunctional aliphatic urethane-acrylate oligomer,
SR351: trimethylolpropane triacrylate, trifunctional acrylate monomer,
SR833S: tricyclodecane dimethanol diacrylate, difunctional acrylate monomer.

The presence of the urethane-acrylate oligomer makes it possible to adjust the hardness and flexibility properties of the temporary protective layer.

The polymerization initiator used in these examples is Irgacure® 184, sold by BASF.

The infrared-absorbing material tested is carbon black sold under the name Monarch 120 by CABOT. The mean size of the particles measured according to standard ISO 22412:2017 by cumulant analysis is between 500 and 750 nm. The carbon black has a weight loss onset temperature, measured by TGA, above 500° C. and below 650° C.

The various constituents and additives are mixed by ultrasonic mixing.

The compositions tested are defined in the table below in parts by weight.

| Compositions | E | C1 | X2 | B3 | A4 |
|---|---|---|---|---|---|
| Polymer matrix: | | | | | |
| acrylate oligomer | 60 | 60 | 60 | 60 | 60 |
| difunctional acrylate | 20 | 20 | 20 | 20 | 20 |
| trifunctional acrylate | 20 | 20 | 20 | 20 | 20 |
| UV initiator | +10 | +10 | +10 | +10 | +10 |
| Carbon black | 0 | 1 | 2 | 3 | 4 |

3. Preparation of the Articles Tested

| Articles | V | C1' | X2' | B3' | A4' |
|---|---|---|---|---|---|
| Substrate without functional coating | Yes | Yes | Yes | Yes | Yes |
| Polymerized composition | No | C1 | X2 | B3 | A4 |

| Articles | F | E | C1 | X2 | B3 | A4 |
|---|---|---|---|---|---|---|
| Substrate + Functional coating | Yes | Yes | Yes | Yes | Yes | Yes |
| Polymerized composition | No | E | C1 | X2 | B3 | A4 |

The polymerizable compositions are applied on substrates made of glass coated with the functional coating by roller coating (Meyer). The applicator roller rotates at a speed of between around 15 and 25 m/min. The thicknesses of polymerizable compositions deposited are between 10 and 20 µm.

The temporary protective layers are obtained by crosslinking by UV radiation provided by a mercury lamp with a power of 120 W. During this step, the article travels at a speed of 15 m/min. The thickness of the temporary protective layer obtained under these conditions is from 10 to 20 µm.

All the compositions tested crosslinked satisfactorily. Insofar as these polymerizable compositions do not comprise solvent, the amounts of infrared-absorbing materials in the polymerizable composition are substantially equal to the amounts of absorbent materials in the temporary protective layer.

The polymer matrix is obtained by crosslinking polymerizable organic compounds. The proportion of the polymerizable compounds in the polymerizable composition is substantially equal to the proportion of polymer matrix in the temporary protective layer.

These examples show that a temporary protective layer comprising up to 4 parts by weight of absorbent materials par 100 parts by weight of polymer matrix has a thickness within the required range. It may be applied and crosslinked at run speeds compatible with the run speeds used in industrial magnetron sputtering deposition processes, for example a continuous in-line functional coating deposition process.

4. Tempering Tests

Tempering tests using a vertical furnace were carried out. The vertical furnace makes it possible to simulate, in a laboratory, the tempering conditions. The glass is held vertically by means of a system of clamps, on a mobile support. This support is automatically inserted into the furnace that is above the requested temperature. Once the tempering time has elapsed, the support comes back down and the glass is subjected to a jet of cold air on its two faces using a system of nozzles. The furnace has no convection and the temperature is regulated with the aid of 3 thermocouples located at three different locations. The following parameters are set:

Furnace temperature: 730° C.,
Tempering time: Variable,
Cooling time: 100 s,
Cold air pressure: 0.7 bar.

For each article, the shortest tempering times were determined. It is verified that the tempering is satisfactory via fracture tests.

a. Determination of the Minimum Tempering Times

The minimum tempering times that make it possible to obtain the required properties were determined. These times correspond to the minimum times to:

obtain a good-quality glazing with in particular absence of breakage, absence of iridescence, absence of corrosion of the functional coating, good flatness, obtain a glazing having a satisfactory fragmentation, and remove the temporary protective layer.

The time savings are calculated in the following manner:

$$G = \frac{|\text{Tempering time of the article to be defined} - \text{Tempering time Article } F| \times 100}{\text{Tempering time article } F}$$

| Art. | Tempering time | Saving | Removal of the layer | Frag. |
|---|---|---|---|---|
| V | 109 s | — | — | OK |
| F | 190 s | — | — | OK |
| E | 150 s | — | Black residues visible after wiping (FIG. 1) | OK |
| C1 | 120 s | >35% | Black powder removed by wiping | OK |
| X2 | 100 s | >45% | Black powder removed by wiping | OK |
| B3 | 100 s | >45% | Black powder removed by wiping | OK |
| A4 | 90 s | >55% | Black powder removed by wiping | OK |

Frag.: Fragmentation

Figure 1:
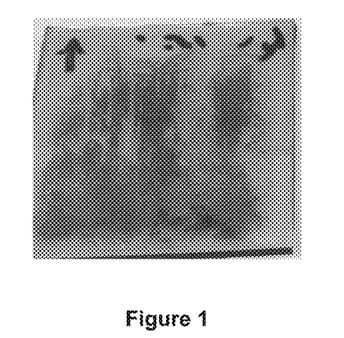

FIG. 1 shows an article comprising a functional coating protected by a temporary protective layer as described in application WO 2015/019022. This article was subjected to a heat treatment for a time of greater than 150 s. Black residues corresponding to a portion of the unburnt temporary protective layer were observed. These residues cannot be removed by wiping.

For the articles according to the invention, the high-temperature heat treatment step is shorter, only a few residues are present but can be removed by wiping.

b. Determination of the tempering quality

Figure 2:
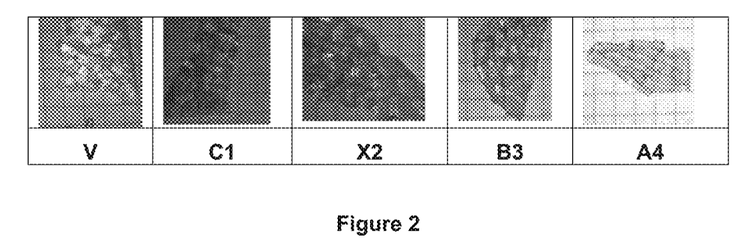

The quality of the tempering was tested by fragmentation. The articles are broken. FIG. 2 represents photographs of the articles V, C1, X2, B3 and A4 that have undergone the fragmentation test. It is observed that for each article the fragmentation is satisfactory. This is expressed by the observation:

of the number of fragments, of the maximum size of the fragments and of the appearance of the edges.

5. Absorption Properties of the Temporary Protective Layers

Measurements of transmittance and reflection were carried out at various wavelengths on various articles.

Figure 3:
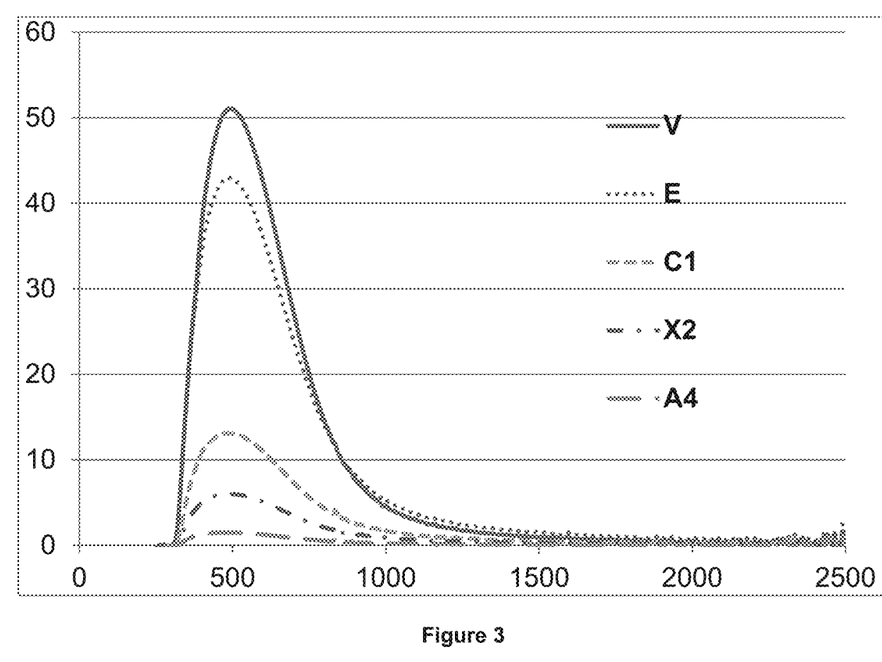

FIG. 3 represents a graph illustrating the transmittance as a function of the wavelengths for the articles V, F, C1, X2 and A4.

Figure 4:
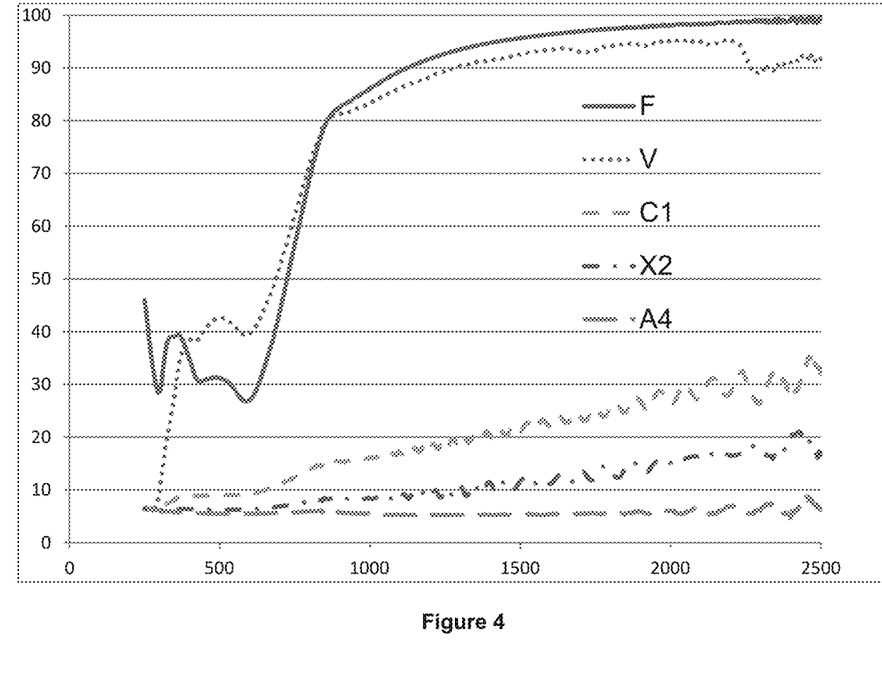

FIG. 4 represents a graph illustrating the reflection as a function of the wavelengths for the articles V, F, C1, X2 and A4.

| | Transmittance (T) and Reflection (R) | | | | | | | | | |
|---|---|---|---|---|---|---|---|---|---|---|
| | 800 nm | | 1250 nm | | 1500 nm | | 1750 nm | | 2000 nm | |
| Article | T | R | T | R | T | R | T | R | T | R |
| V | 86% | — | 84% | — | 86% | — | 88% | — | 87% | — |
| C1' | 36% | — | 38% | — | 42% | — | 45% | — | 47% | — |
| X2' | 18% | — | 21% | — | 24% | — | 26% | — | 28% | — |
| A4' | 5% | — | 7% | — | 8% | — | 10% | — | 11% | — |
| F | 14% | 69% | 2% | 93% | 1% | 96% | 0.6% | 97% | 0.3% | 98% |
| E | 14% | 72% | 2% | 90% | 1% | 93% | 1% | 93% | 0.8% | 95% |
| C1 | 4% | 14% | 1% | 19% | 0.5% | 21% | 0.3% | 25% | 0.3% | 26% |
| X2 | 2% | 8% | 0.5% | 10% | 0.3% | 12% | 0.2% | 12% | 0.2% | 15% |
| A4 | 1% | 6% | 0.1% | 5% | 0.1% | 5% | 0.1% | 6% | 0.1% | 6% |

The variations in transmittance or reflection induced by the temporary protective layer, $\Delta T=|T.ref-T.pro|$ and $\Delta R=|R.ref-R.pro|$, are calculated with: T.ref and R.ref being the transmittance or reflection at a wavelength between 800 and 2000 nm of an article that does not comprise a temporary protective layer and T.pro and R.pro being the transmittance or reflection of the same article comprising the temporary layer.

The variation in the transmittance in the infrared induced by the temporary protective layer was calculated by taking as reference:
article V for articles C1', X2' and A4',
article F for articles E, C1, X2 and A4.

|     | Δ T at 800 nm | Δ T at 2000 nm | Δ R at 800 nm | Δ R at 2000 nm |
|-----|---------------|----------------|---------------|----------------|
| C1' | 50%           | 40%            | —             | —              |
| X2' | 68%           | 59%            | —             | —              |
| A4' | 81%           | 76%            | —             | —              |
| E   | 0%            | 0.5%           | 3%            | 3%             |
| C1  | 10%           | 0%             | 55%           | 72%            |
| B3  | 12%           | 0.1%           | 61%           | 83%            |
| A4  | 13%           | 0.2%           | 63%           | 92%            |

The presence of the temporary protective layer comprising infrared-absorbing materials leads to a variation in the transmittance of greater than 20% or a variation in the reflection of greater than 20% at a given wavelength between 800 and 2000 nm.

The invention claimed is:

1. An article comprising a glass substrate comprising two main faces defining two main surfaces separated by edges, said glass substrate bearing:
   a functional coating deposited on at least one portion of a main surface, and
   a temporary protective layer insoluble in water deposited on at least one portion of the functional coating having a thickness between 10 and 50 micrometers,
   wherein the temporary protective layer comprises an organic polymer matrix obtained from a polymerizable composition comprising (meth)acrylate compounds, and infrared-absorbing materials, the (meth)acrylate compounds that have reacted together representing at least 90%, by weight of the polymer matrix.

2. The article as claimed in claim 1, wherein the infrared-absorbing materials represent 0.5 to 10 parts by weight per 100 parts by weight of the organic polymer matrix.

3. The article as claimed in claim 1, wherein the temporary protective layer leads to:
   a variation in the transmittance, measured at a wavelength of between 800 and 2000 nm, of greater than 20%, or
   a variation in the reflection, measured at a wavelength of between 800 and 2000 nm, of greater than 20%.

4. The article as claimed in claim 1, wherein the infrared-absorbing materials have a weight loss onset temperature above 300° C.

5. The article as claimed in claim 1, wherein a ratio of the thickness of the temporary protective layer to a mean size of particles forming the infrared-absorbing materials is greater than 3.

6. The article as claimed in claim 1, wherein the infrared-absorbing materials are chosen from pigments chosen from carbon black, aniline black pigments, iron oxide black pigments, titanium oxide black pigments.

7. The article as claimed in claim 1, wherein the polymer matrix represents at least 80% by weight of the temporary protective layer.

8. The article as claimed in claim 1, wherein the glass substrate bearing the functional coating has not undergone heat treatment at a temperature above 400° C.

9. The article comprising a substrate as claimed in claim 1, wherein the functional coating comprises a stack of layers successively comprising, starting from the substrate, an alternation of n functional metallic layers based on silver or on a metal alloy containing silver, and of (n+1) antireflection coatings, each antireflection coating comprising at least one dielectric layer, so that each functional metallic layer is positioned between two antireflection coatings.

10. A process for obtaining an article treated at high temperature, the article comprising a glass substrate comprising two main faces defining two main surfaces separated by edges, said glass substrate bearing a functional coating deposited on at least one portion of a main surface, said process comprising:
    a step of protecting the article comprising:
       preparing a polymerizable composition comprising (meth)acrylate compounds and infrared-absorbing materials, the (meth)acrylate compounds that have reacted together representing at least 90%, by weight of the polymer matrix,
       applying the composition on at least one portion of the functional coating over a thickness between 10 and 50 micrometers,
       crosslinking the composition so as to form the temporary protective layer, said temporary protective layer being insoluble in water,
    a same step of heat treating and deprotecting the article comprising:
       removing the temporary protective layer by heat treatment at a temperature above 200° C. and sufficient to achieve the tempering of the article.

11. The process for obtaining an article as claimed in claim 10, wherein the functional coating is deposited by magnetron sputtering and wherein the temporary protective layer is directly in contact with the functional coating.

12. The process for protecting an article as claimed in claim 10, wherein:
    the temporary protective layer is crosslinked by UV crosslinking,
    the polymerizable composition is applied by roller coating.

* * * * *